(12) United States Patent
Bastug et al.

(10) Patent No.: US 8,259,854 B2
(45) Date of Patent: Sep. 4, 2012

(54) CHANNEL ESTIMATION USING COMMON AND DEDICATED PILOTS

(75) Inventors: Ahmet Bastug, Istonbul (TR); Giuseppe Montalbano, Villeneuve Loubet (FR)

(73) Assignee: ST-Ericsson SA, Geneva (CH)

( * ) Notice: Subject to any disclaimer, the term of this patent is extended or adjusted under 35 U.S.C. 154(b) by 612 days.

(21) Appl. No.: 12/296,891

(22) PCT Filed: Apr. 11, 2007

(86) PCT No.: PCT/IB2007/051299
§ 371 (c)(1),
(2), (4) Date: May 19, 2009

(87) PCT Pub. No.: WO2007/119207
PCT Pub. Date: Oct. 25, 2007

(65) Prior Publication Data
US 2009/0323874 A1 Dec. 31, 2009

(30) Foreign Application Priority Data
Apr. 13, 2006 (EP) .................................... 06300358

(51) Int. Cl.
*H03K 9/00* (2006.01)
*H04L 27/00* (2006.01)

(52) U.S. Cl. ........ 375/316; 375/324; 375/340; 375/229; 381/103; 333/18; 708/323

(58) Field of Classification Search .................... 375/316
See application file for complete search history.

(56) References Cited

U.S. PATENT DOCUMENTS

| 7,551,597 B2 * | 6/2009 | Nilsson et al. ................. 370/350 |
| 7,705,750 B2 * | 4/2010 | Holmberg et al. ............. 340/937 |
| 2003/0099306 A1 * | 5/2003 | Nilsson et al. ................. 375/316 |
| 2004/0102203 A1 | 5/2004 | Tiirola et al. |

(Continued)

FOREIGN PATENT DOCUMENTS
WO   WO 2004040869 A1 *   5/2004

OTHER PUBLICATIONS

Bastug et al., "Common and Dedicated Pilot-Based Channel Estimates Combining and Kalman Filtering for WCDMA Terminals", Asilomar Conference on Signals, Systems and Computers, Oct. 28, 2005 pp. 111-115, XP010899963, Piscataway, US, the whole document.

(Continued)

*Primary Examiner* — Shuwang Liu
*Assistant Examiner* — Gina McKie
(74) *Attorney, Agent, or Firm* — William J. Kubida; Peter J. Meza; Hogan Lovells US LLP

(57) ABSTRACT

The present invention relates to a receiver apparatus and method of channel estimation in a telecommunication system which provides at least two pilot sequences, and to a computer program product. Channel estimation is achieved by estimating channel taps separately for each of the at least two pilot sequences in every transmission block, and for applying estimated channel taps obtained from the estimation to at least one of a temporal and spatial filtering or combining operation to refine the channel estimate. Accordingly, temporal correlations and cross-correlations of the at least two pilot sequences are exploited without requiring knowledge of path delays and beamforming parameters.

17 Claims, 8 Drawing Sheets

U.S. PATENT DOCUMENTS

| | | | |
|---|---|---|---|
| 2005/0163258 A1* | 7/2005 | Gore et al. | 375/340 |
| 2005/0185724 A1* | 8/2005 | Wang et al. | 375/260 |
| 2005/0195763 A1* | 9/2005 | Kadous et al. | 370/328 |
| 2007/0116374 A1* | 5/2007 | Despain | 382/261 |
| 2009/0191835 A1* | 7/2009 | Lozano et al. | 455/334 |
| 2012/0082197 A1* | 4/2012 | Jonsson et al. | 375/224 |

OTHER PUBLICATIONS

Montalbano, Slock: "Joint common-dedicated pilots based estimation of time-varying channels for W-CDMA receivers", IEEE Vehicular Technology Conference, Oct. 6, 2003, pp. 1253-1257, vol. 12, XP010700835, Piscataway, US, the whole document.

Usuda et al., "Optimizing the number of dedicated pilot symbols for forward link in W-CDMA systems", IEEE Vehicular Technology Conference, May 15, 2000, pp. 2118-2122, XP000968378, New York, US, abstract.

Yeredor: "Mom-orthogonal join diagonalization in the least-squares sense with application in blian source sparation", IEEE Transactions on Signal Processing, vol. 50, No. 7, Jul. 2002, pp. 1545-1553, XP011080187, New York, US, absract.

PCT International Search Report PCT/IB2007/051299, mailing date Oct. 30, 2007.

* cited by examiner

CHANNEL ESTIMATION USING COMMON AND DEDICATED PILOTS

CROSS-REFERENCE TO RELATED APPLICATIONS

The present application is a U.S. national filing of PCT/IB2007/051299 filed Apr. 11, 2007, which is incorporated herein in its entirety by this reference.

FIELD OF THE INVENTION

The present invention relates to a receiver apparatus and method of channel estimation based on a combined exploitation of dedicated and common pilot sequences. As an example, the present invention relates to a receiver apparatus and channel estimation method for a user-dedicated downlink channels in the Universal Mobile Telecommunications System (UMTS).

BACKGROUND OF THE INVENTION

A UMTS communication system comprises at least a base station (BS) referred to as Node B and a mobile phone terminal referred to as user equipment (UE) throughout the document. Both the Node B and the UE comprise a transmitter and a receiver. The Node B sends signals by means of its transmitter to the UE receiver in the downlink. The UE sends signals by means of its transmitter to the receiver of the Node B in the uplink. In uplink and downlink communication both the UE and the Node B map the data to be transmitted into physical channels.

The UMTS standard provides two physical channels for downlink communication, a first channel denoted "Common Pilot Channel" (CPICH) consisting of a continuous sequence of known pilot symbols, and a second physical channel denoted "Dedicated Physical Channel" (DPCH). The DPCH consists of a first logical sub-channel denoted "Dedicated Physical Data Channel" (DPDCH) which carries the information data symbols intended for the user concerned, time-multiplexed with a second logical sub-channel denoted "Dedicated Physical Control Channel" (DPCCH) which carries known user-dedicated pilot symbols.

FIG. 2 shows slot structures (each slot consisting of 2560 chips) provided in fifteen slots S0 to S14 of the above two different pilot sequence bearers in the UMTS downlink. The CPICH channel continuously transmits common pilot symbols CP, while the DPCH channel intermittently transmits dedicated pilot symbols DP in the DPCCH sub-carrier.

It is noted that the term "physical data channel" such as DPCH and CPICH, denotes a channel which carries the data, while in the following the term "transmission channel" is intended to cover also signal processing elements or functions, such as pulse shaping and pulse shape matched filter (or antialiasing filter), which distort the data.

The UE receiver needs to estimate the transmission channel parameters in order to demodulate, decode, and recover the information data contained in the DPDCH channel. In the absence of transmit beamforming the transmission channel parameters associated with the CPICH channel and the DPCH channel are fairly the same. The continuous provision of known pilot symbols of the CPICH physical channel can be easily used at the UE receiver to estimate the related transmission channel, which is the same as the transmission channel associated with the DPCH channel, and then use this estimate for DPDCH information data recovery. In general, known channel estimation techniques proposed for UMTS receivers were generally based on either the common pilot sequence of the CPICH channel or on the dedicated pilot sequence provided in the DPCH channel.

Transmit beamforming can be employed at the Node B during downlink communication to improve the reception at the UE of the user information data mapped into the physical channel DPDCH. To perform transmit beamforming, the Node B needs to be equipped with multiple antennas. In this way it is possible to provide optimal spatial filtering by shaping beams in the directions of the user concerned while setting nulls in other user directions to mitigate the interference to other users. While transmit beamforming is to be employed for the transmission of the physical channel DPCH, it is not suited for the physical channel CPICH transmission that is to be uniformly broadcasted in time and space (i.e. in all directions) to all users.

The channel estimation approach relying on the DPCCH channel has limited accuracy due to the reduced number of dedicated pilot symbols DP per slot. Furthermore, the lack of dedicated pilot symbols DP during the DPDCH period prevents tracking fast channel variations. The classical channel estimation approach based on the common pilot symbols CP of the CPICH channel can better adapt to fast fading conditions. However, it cannot be used in the presence of beamforming.

There have already been some proposals for path-wise dedicated channel estimation, which make use of both dedicated and common pilots. However, they assume that they have perfect a priori knowledge of the path delays and the channel associated with the DPCH is identical to the one associated with the CPICH, which is not the case when there is beamforming.

Additionally, the US 20040102203-A1 discloses channel estimation at a UE in the presence of transmit beamforming, wherein more than one pilot source is exploited. The proposed channel estimation is based on a pathwise (sparse multipath) channel model and correlators are used to estimate the multipath parameters independently at a first step and at a second combining step. Channel estimates obtained from several pilot sequences are explicitly combined. The method is suitable for Rake type receivers.

SUMMARY OF THE INVENTION

It is an object of the present invention to provide an enhanced channel estimation scheme for better performance and various receiver types.

This object is achieved by a receiver apparatus as claimed in claim 1 and a channel estimation method as claimed in claim 8.

Accordingly, at least one of spatial and temporal correlations of the at least two pilot sequences are exploited to obtain an optimized channel estimation performance. Knowledge of path delays and beamforming parameters is not required. The proposed estimation mechanism is suitable for all types of receivers including discrete time Rake and particularly equalizers in FIR form and the interference cancellation schemes. The at least two pilot sequences may comprise a first pilot sequence broadcast in a common pilot channel, and a second pilot sequence broadcast in a dedicated pilot channel. The joint evaluation of common and dedicated pilot sequences provides the advantage that limitations in use of one of the dedicated and common pilot sequences can be enhanced by exploiting the respective other sequence.

Preferably, the estimation may be a least square estimation, which provides the advantageous property that all channel taps have the same error variance.

Furthermore, the filtering operation may be a Kalman filtering operation.

At least one correlation factor may be estimated for the obtained estimated channel taps. The at least one correlation factor may be compared with a respective threshold value, and a selection may be done between a scalar filtering operation, involving estimated taps of only one of the at least two pilot sequences, and a vector filtering operation, involving estimated taps of more than one of the at least two pilot sequences, based on the result of the comparison. Thereby, a selection mechanism between scalar and vector Kalman filtering based on the estimated correlation coefficients can be provided. As an example, a temporal correlation factor and a cross correlation factor may be used, wherein the temporal and cross correlation factors are compared with respective threshold values.

The at least one correlation factor may be estimated by a covariance matching technique.

The steps of the above channel estimation method may be implemented by discrete hardware devices or by software routines controlling a corresponding processor or computer device responsible for channel estimation. Hence, the proposed solution may be implemented as a computer program product comprising code means adapted to generate the steps of the above method when run on a computer device.

Further advantageous developments are defined in the dependent claims.

BRIEF DESCRIPTION OF THE DRAWINGS

The present invention will now be described based on a preferred embodiment with reference to the accompanying drawings in which.

DETAILED DESCRIPTION OF PREFERRED EMBODIMENTS

In the following, the preferred embodiment will be described based on a receiver of a UE according to the UMTS standard.

Figure 1:
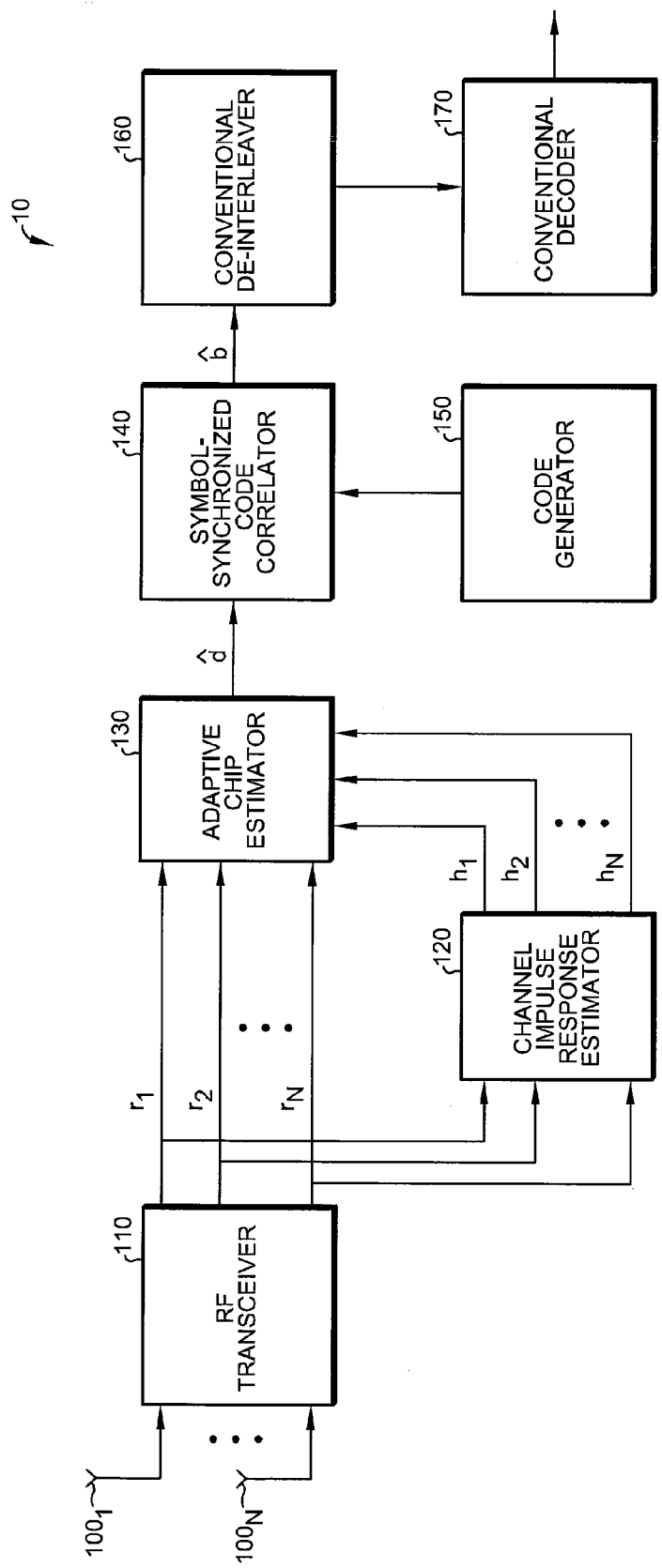
FIG. 1 shows a schematic block diagram of a receiver architecture in which the present invention can be implemented.
Figure 2:
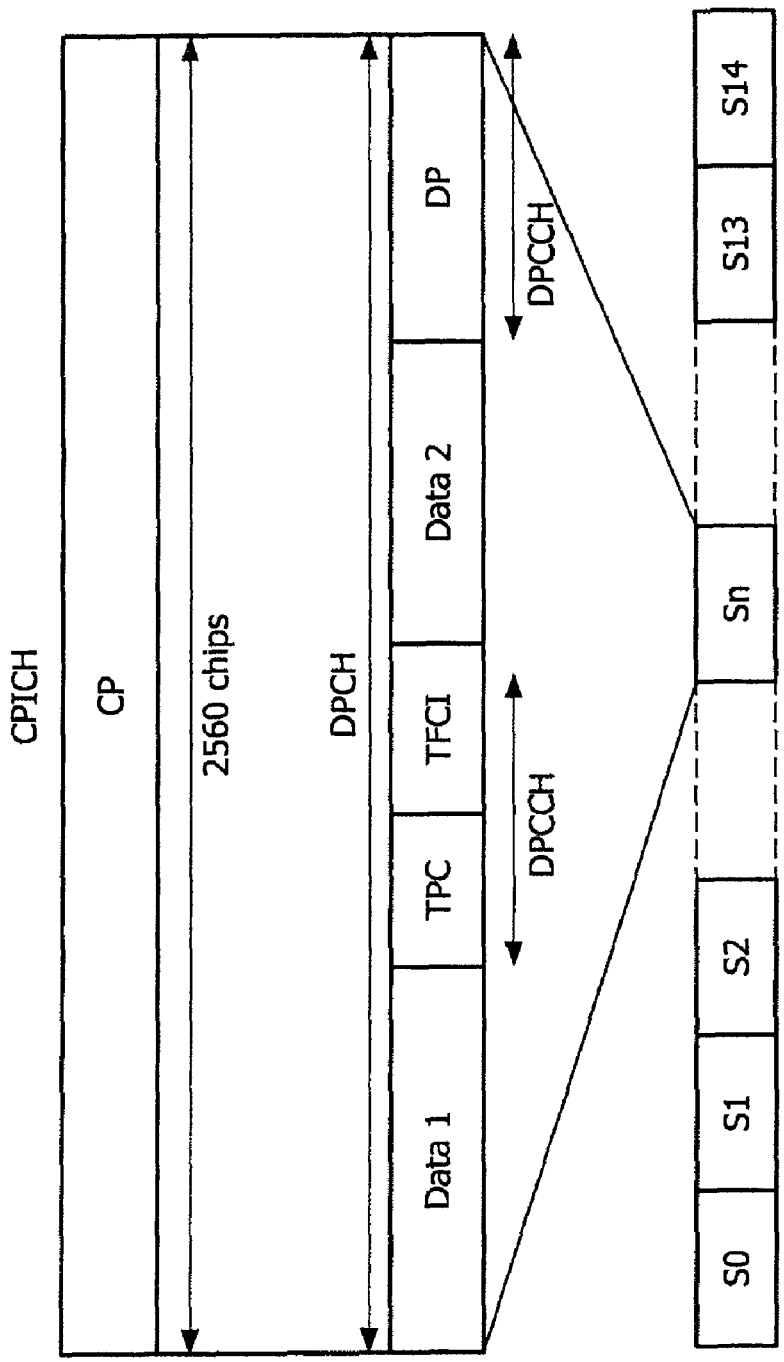
FIG. 2 shows slot structures of logical UMTS channels.

FIG. 1 shows a schematic block diagram of the receiver 10 in which the preferred embodiment of the present invention can be implemented. The receiver 10 has an adaptive interference suppression algorithm, which is based on channel equalization and suitable for synchronous CDMA (Code Division Multiple Access) systems using orthogonal spreading codes with code scrambling. In particular, the receiver 10 is not obliged to have any training sequence or training information for the adaptation of the equalization. It only needs initialization weights obtained from a channel estimation scheme.

According to FIG. 1, at least one antenna $100_1$ to $100_N$ receives signals from a telecommunications channel. The signals are coupled to a conventional RF transceiver 110 including an analog-to-digital (A/D) converter. The conventional RF transceiver 10 may optionally perform chip waveform filtering. The converted signals $r_1$ to $r_N$ are forwarded to a channel impulse response estimator 120 and to an adaptive chip estimator 130. The channel impulse response estimator 120 operates to estimate the impulse response of the channel and provides reference input factors or weights $h_1$ to $h_N$ to the adaptive chip estimator 130 in order to provide initialization weights. The output of the adaptive chip estimator 130 is coupled to a symbol-synchronized code correlator 140. The correlator 140 de-spreads the output d of the adaptive chip estimator 130 by multiplying it with the output of a code generator 150, and then integrating over the symbol period. The code generator 150 is capable of generating a required spreading code. The output of the correlator 140 is coupled to a conventional de-interleaver 160 which intern is coupled to a conventional decoder 170 which outputs data decisions.

The proposed equalizer function achieved by the channel impulse response estimator 120 and the adaptive chip estimator 130 serves to suppress multiple access interference by striving to restore orthogonality of the users waveforms at the receiver by estimating the transmitted multi-user chips and thus equalizing the channel. With a perfectly estimated chip sequence, the desired users signal can be restored without any residual interference from the other users by correlating the multi-user chip sequence with the scrambling code and spreading code of the user.

The need for the training sequence is avoided by using knowledge of the correlation between the desired signal (multi-user chip sequence) and the received signal. To achieve this, the receiver 10 employs the channel impulse response estimator 120 to estimate the channel impulse response.

In the presence of dedicated beamforming, the DPCH and CPICH associated propagation channels are correlated to a certain extent, as it has been shown by proprietary field test measurements. This correlation can be exploited to improve the estimate of DPCH associated channel. Another aspect that might get exploited is the memory in the channel parameters. By fitting the channel dynamics to an autoregressive model of sufficient order, one can apply Kalman filtering to refine the blockwise (slotwise in the present treatment) obtained estimates. According to the preferred embodiment, the problem of time-varying dedicated channel estimation can be solved by optimally combining all the known sources of information, i.e., via exploiting the temporal and cross-correlations of common and dedicated pilots without the knowledge of path delays and beamforming parameters.

Figure 3:
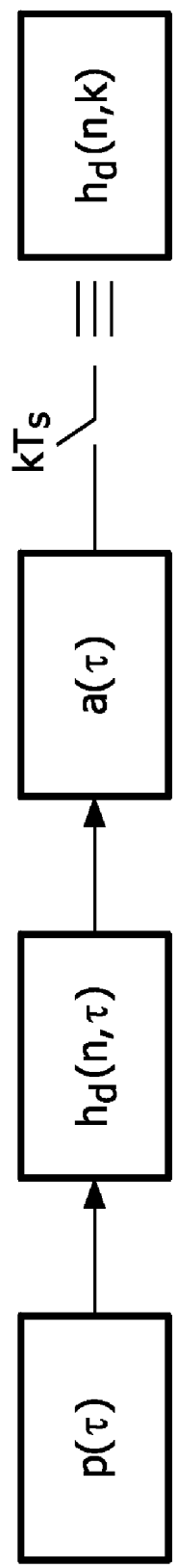
FIG. 3 shows a schematic block diagram of an FIR channel model.

FIG. 3 shows a schematic block diagram of a discrete-time FIR model which is considered for the transmission channel h(k) which is the sampled form of the continuous-time overall impulse response containing the cascade of the rrc pulse shape p(τ) at the transmitter side, the multipath propagation channel h(τ), and the receiver front-end filter a(τ). In FIG. 3, also the slot index n is included in relevant places to stress the time-varying nature of the channel. $T_s$ is the sampling period which is equal to chip period $T_c$ in case of chip-rate sampling and is equal to $T_c/M$ in case of M times oversampling. We assume that the sampled DPCH and CPICH channels have N taps. Then, the resulting FIR models in column vector format can be expressed as:

$$h_d(n)=[h_d(n,0),\ldots,h_d(n,k),\ldots,h_d(n,N-1)]^T \text{ and}$$

$$h_c(n)=[h_c(n,0),\ldots,h_c(n,k),\ldots,h_c(n,N-1)]^T$$

respectively for the channels associated with DPCH and CPICH.

The channel estimation performed by the channel impulse response estimator 120 is based on a two-step procedure, where an inside-slot least squares (LS) estimation of FIR channels forms the first step. Namely, as an initial step, brute LS estimation of $h_d(n)$ and $h_c(n)$ is applied. Let $P_d(n) = P'_d(n) \otimes I_M$, where "$\otimes$" represents the Kronecker product, $P'_d(n)$ represents the Hankel matrix comprising the dedicated pilot chip sequence intended for the user of interest in slot n, M represents the oversampling factor when applicable, and $P_d(n)$ represents the effective block Hankel matrix. Similarly, $P_c(n) = P'_c(n) \otimes I_M$, can be referred to as the block Hankel matrix for the common pilot chip sequence.

The received signal samples vector y(n) corresponding to slot n can be expressed as:

$$y(n) = P_d(n) h_d(n) + P_c(n) h_c(n) + v(n)$$

where v(n) represents the additional noise and interference originating from the own cell and the surrounding cells.

The LS channel estimation procedures can be formulated as:

$$\hat{h}_d(n) = \arg\min_{h_d} \|y(n) - P_d(n) h_d(n)\|^2 \text{ and}$$

$$\hat{h}_c(n) = \arg\min_{h_c} \|y(n) - P_c(n) h_c(n)\|^2$$

respectively for dedicated and common channels. The exact solutions are expressed as:

$$\hat{h}_d(n) = [P_d(n)^H P_d(n)]^{-1} P_d(n)^H y(n) \text{ and}$$

$$\hat{h}_c(n) = [P_c(n)^H P_c(n)]^{-1} P_c(n)^H y(n).$$

If pilot chips are modeled as independent, identically distributed (i.i.d.) random variables, these solutions can be approximated by the following expressions:

$$\hat{h}_d(n) = \beta_d^{-1} P_d(n)^H y(n) \text{ and}$$

$$\hat{h}_c(n) = \beta_c^{-1} P_c(n)^H y(n)$$

which brings a significant reduction in complexity. $\beta_d$ and $\beta_c$ represent the dedicated and common pilot chip sequences total energies respectively. One important property of the LS estimation is that all the channel taps have the same error variance. Hence, one error variance $\sigma_{\hat{e}_d}^2$ needs to be estimated for the channel associated with DPCH and one error variance $\sigma_{\hat{e}_c}^2$ for the channel associated with CPICH. $\sigma_{\hat{e}_d}^2$ and $\sigma_{\hat{e}_c}^2$ can be estimated from $\hat{h}_d(n,k)$ and $\hat{h}_c(n,k)$ at delays k where the channel is not expected to carry any energy. This can be realized by overestimating the channel delay spread, i.e over-considering N and using the average powers at the tails of the channel estimates to obtain unbiased estimates of $\sigma_{\hat{e}_d}^2$ and $\sigma_{\hat{e}_c}^2$.

As the second step, joint (vector) Kalman filtering is applied between slots. The second step works in parallel (independently) for each tap.

In addition to the correlation between dedicated and common channels, there is also the channel temporal correlation governed by the Doppler spread, which can be exploited to improve the channel estimation accuracy. To this end, by fitting each channel tap dynamics to a first order autoregressive model, Kalman filtering can be applied to refine the previously block-wise obtained channel tap estimates. In order to exploit both degrees of freedom, it is necessary to know both the temporal correlation factor ρ and the DPCH-CPICH tap cross-correlation factor α. They can be estimated by applying covariance matching techniques described for example in A. Yeredor, "Non-orthogonal joint diagonalization in the least-squares sense with application to blind source separation," *IEEE Transactions on SP*, Vol. 50, No. 7, pp. 1545-1553, July 2002. Once the correlation factors ρ and α are known for any channel tap with index k, the known optimal recursive MMSE (Minimum Mean Square Error) estimator technique, i.e. the vector Kalman filter, can be applied for that particular channel tap.

In the following, a state representation is given.

The present state vector is expressed as follows:

$$h(n) = \begin{bmatrix} h_d(n, k) \\ h_c(n, k) \end{bmatrix}$$

Based thereon, the following state transition equation is applied:

$$h(n+1) = \rho h(n) + Bu(n)$$

with an input gain matrix:

$$B = \sqrt{1 - |\rho|^2} \begin{bmatrix} 1 & 0 \\ \alpha & \sqrt{1 - |\alpha|^2} \end{bmatrix}$$

and an input vector:

$$u(n) = \begin{bmatrix} \Delta h_d(n, k) \\ \Delta h_c(n, k) \end{bmatrix}$$

The input covariance matrix is expressed as follows:

$$R_{uu} = \begin{bmatrix} \sigma_{\Delta h_d}^2 & 0 \\ 0 & \sigma_{\Delta h_c}^2 \end{bmatrix} = \begin{bmatrix} \sigma_{h_d}^2 & 0 \\ 0 & \sigma_{h_c}^2 \end{bmatrix}$$

The innovations vector corresponds to Bu(n) and the innovations covariance matrix is defined by:

$$B R_{uu} B^H = Q$$

Based on the above state representation, the estimation output can be represented based on the measurement equation:

$$z(n) = h(n) + w(n),$$

where the measurement corresponds to a LS estimate of the channel tap from the previous step:

$$z(n) = \begin{bmatrix} \hat{h}_d(n, k) \\ \hat{h}_c(n, k) \end{bmatrix}$$

with a measurement noise:

$$w(n) = \begin{bmatrix} e_d(n, k) \\ e_c(n, k) \end{bmatrix}$$

The measurement noise covariance matrix can be expressed as follows:

$$R_{ww} = V = \begin{bmatrix} \sigma_{e_d}^2 & 0 \\ 0 & \sigma_{e_c}^2 \end{bmatrix}$$

The FIR filter is initialized to the initial state estimate $$\hat{h}(0\mid 0) = \hat{h}(0).$$

During the Kalman recursions, the present state error covariance matrix can be expressed as follows:

$$S(n\mid n) = E\left(\left[h(n) - \hat{h}(n\mid n)\right]\left[h(n) - \hat{h}(n\mid n)\right]^H\right)$$

with a time update $$\hat{h}(n+1\mid n) = \rho\hat{h}(n\mid n).$$

Then, the state prediction covariance matrix is obtained as follows:

$$S(n+1\mid n) = |\rho|^2 S(n\mid n) + Q$$

Assuming a filter gain:

$$G(n+1) = S(n+1\mid n)[S(n+1\mid n) + V]^{-1}$$

the measurement update can be obtained as follows:

$$\hat{h}(n+1\mid n+1) = [I_2 - G(n+1)]\hat{h}(n+1\mid n) + G(n+1)z(n),$$

which leads to the following updated state covariance matrix:

$$S(n+1\mid n+1) = [I_2 - G(n+1)]S(n+1\mid n)$$

It is noted that the above first step LS estimation fits to the measurements part of the second step Kalman filtering.

The explained Vector Kalman filtering procedure is optimal in the MMSE sense in all conditions. However the performance improvement with regard to the Scalar Kalman filtering that is applied only to the channel tap associated with DPCH is very limited when the two channel taps are not very much correlated and the temporal correlation factor is very high. In this case, it is not necessary to utilize CPICH estimates. Based on this fact, an overall strategy can be applied for the channel estimation task.

Figure 4:
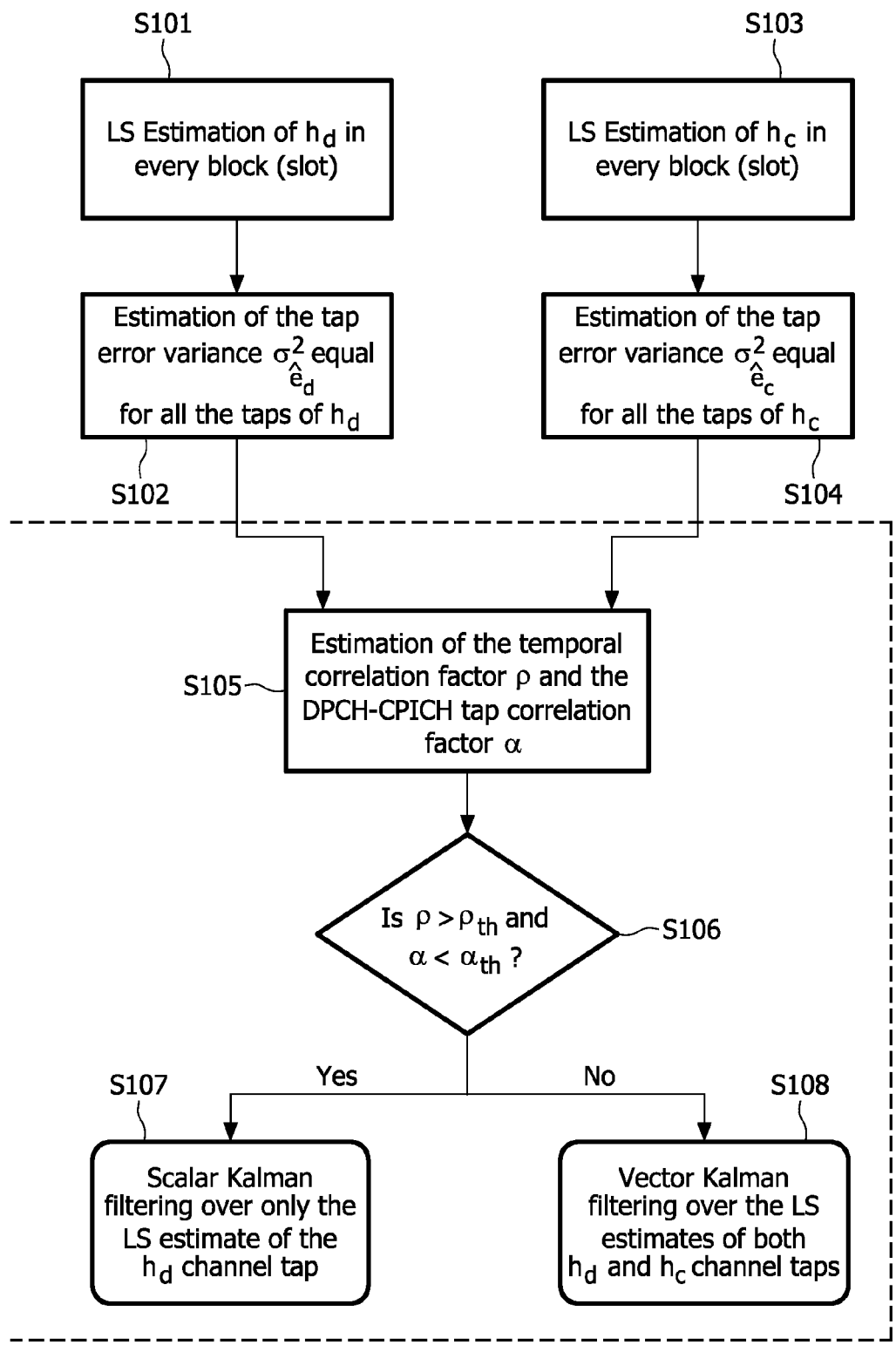
FIG. 4 shows a schematic flow diagram of a channel estimation method according to the preferred embodiment.

FIG. 4 shows a schematic flow diagram of the proposed overall estimation procedure according to the preferred embodiment.

In step S101, LS estimation of hd is performed in every slot (or block) of the DPCH. Then, in step S102, the tap error variance for DPCH is calculated, which is equal for all taps of $h_d$. Parallel to the above steps S101 and S102, LS estimation of $h_c$ is performed in every slot (or block) of the CPICH in step S103, and, in step S104, the tap error variance for CPICH is calculated, which is equal for all taps of $h_c$.

Thereafter, in step S105, the temporal correlation factor $\rho$ and the cross-correlation factor $\alpha$ are estimated based on the above equations. Depending on how much channel estimation accuracy is desired, two thresholds $\rho_{th}$ and $\alpha_{th}$, respectively, can be defined for the DPCH-CPICH temporal coefficient $\rho$ and cross-correlation coefficient $\alpha$. In step S106, a threshold comparison is performed. If $(\rho > \rho_{th})$ and $(\alpha < \alpha_{th})$ then scalar Kalman procedure is applied in step S107 over LS estimates of the DPCH channel taps. Otherwise, vector Kalman procedure is applied in step S108 over LS estimates of both DPCH and CPICH channel taps.

Thus, joint Kalman treatment is applied for the estimation of DPCH channel parameters, while a selection mechanism between scalar and vector Kalman filtering is used based on the estimated correlation coefficients.

FIGS. 5 to 8 show diagrams of simulation results which compare the DPCH channel estimation normalized mean square error (NMSE) vs. chip-energy-to-noise ratio ($E_c/N_0$) performances of LS estimation, scalar Kalman using only the LS channel estimates associated with DPCH, and vector Kalman, which jointly treats the LS channel estimates associated with DPCH and CPICH.

Figure 5:
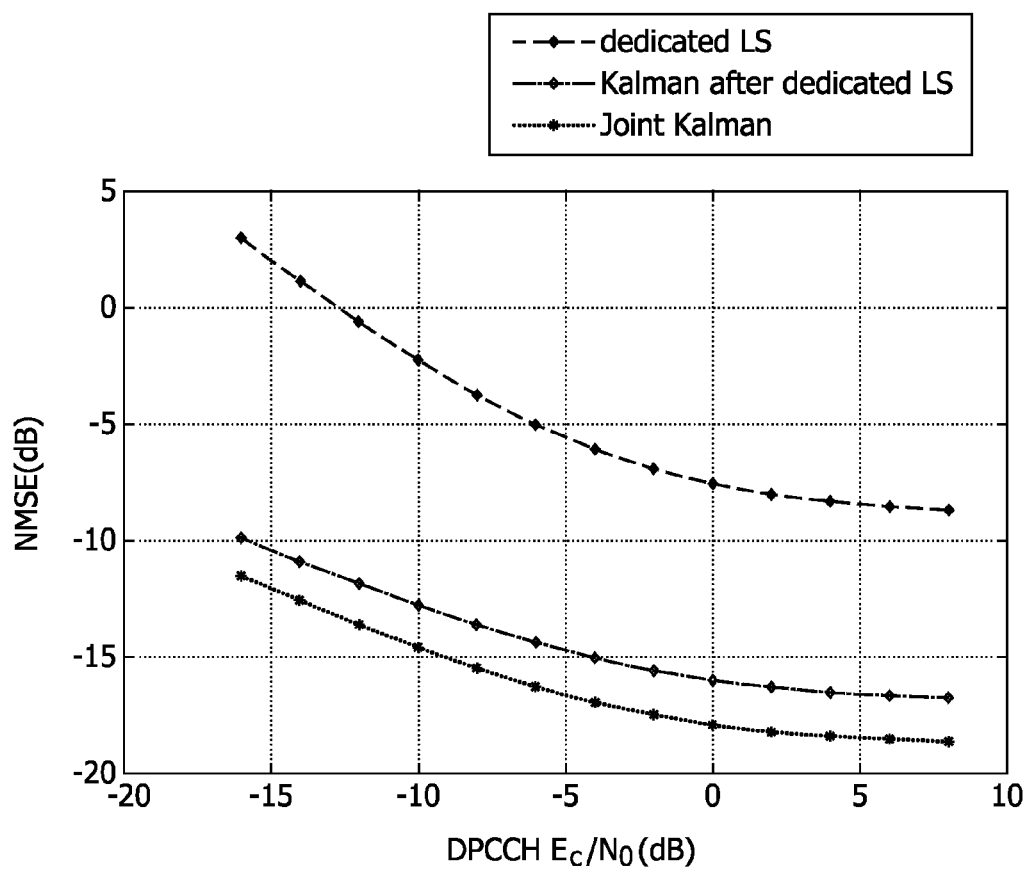
FIGS. 5 to 8 show a diagrams indicating simulation results which compare DPCH channel estimation normalized mean square error (NMSE) performances of different estimation steps at different correlation rates.

The diagram of FIG. 5 relates to a case where both correlations are strong, i.e., $\rho=0.99$ and $\alpha=0.95$. Here, the joint vector Kalman filtering provides an improvement of −2 dB in NMSE performance compared to scalar Kalman filtering.

Figure 6:
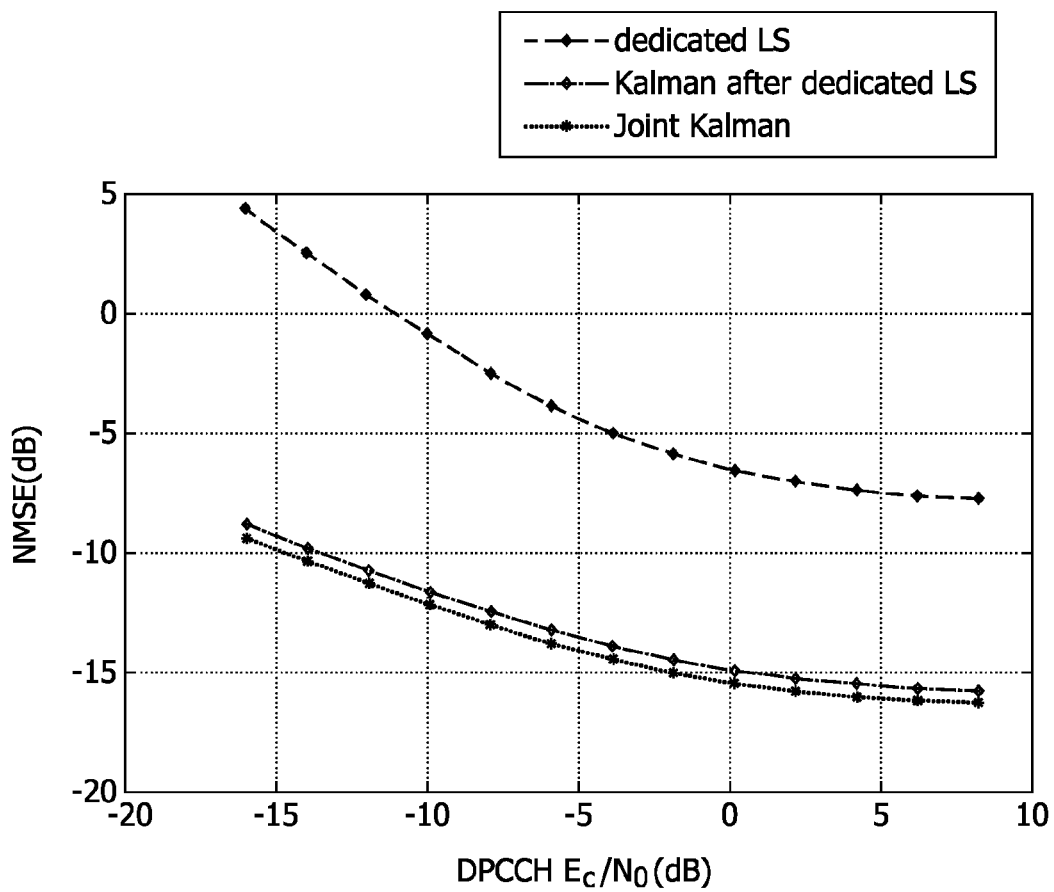

The diagram of FIG. 6 relates to a case where only the temporal correlation is very strong, i.e., $\rho=0.99$ and $\alpha=0.8$. Here, the joint vector Kalman filtering provides an improvement of only less than 1 dB in NMSE performance compared to scalar Kalman filtering.

Figure 7:
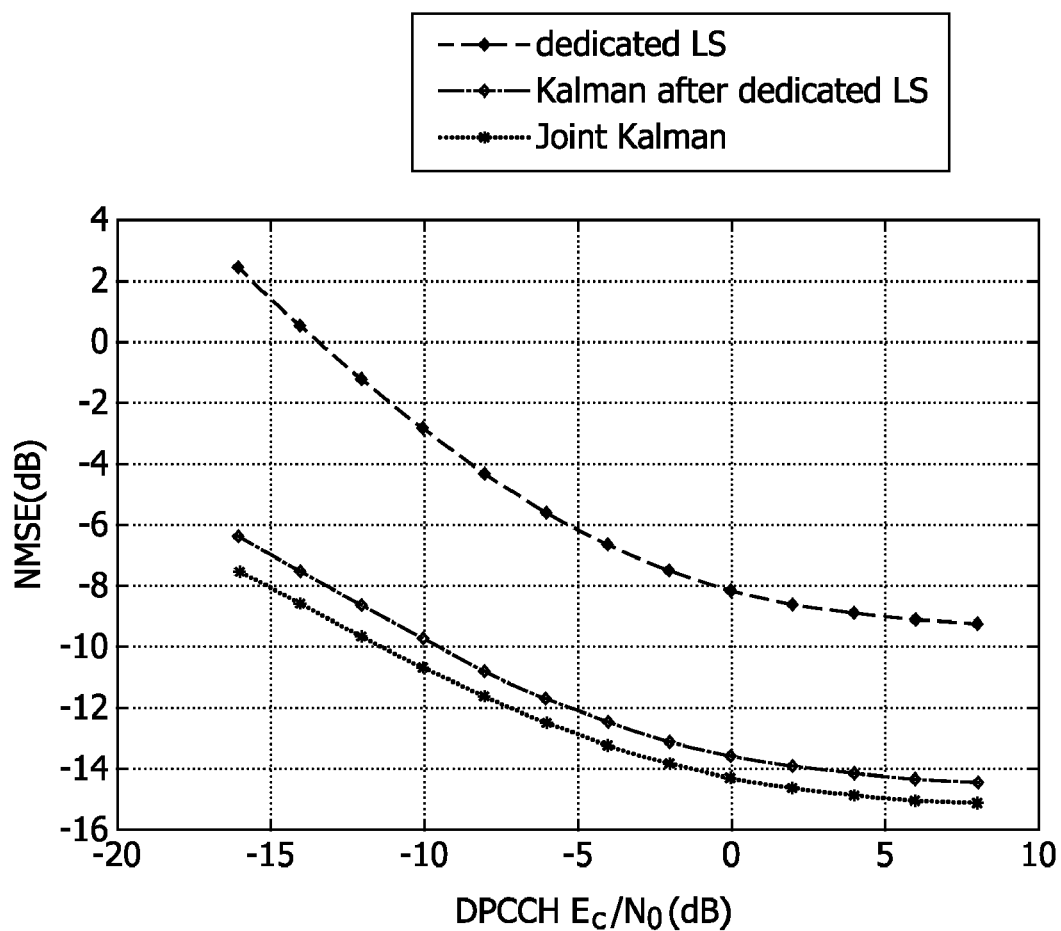

The diagram of FIG. 7 relates to a case where both correlations are weaker, i.e., $\rho=0.8$ and $\alpha=0.8$. Here, the joint vector Kalman filtering provides an improvement of only 1 dB in NMSE performance compared to scalar Kalman filtering.

Figure 8:
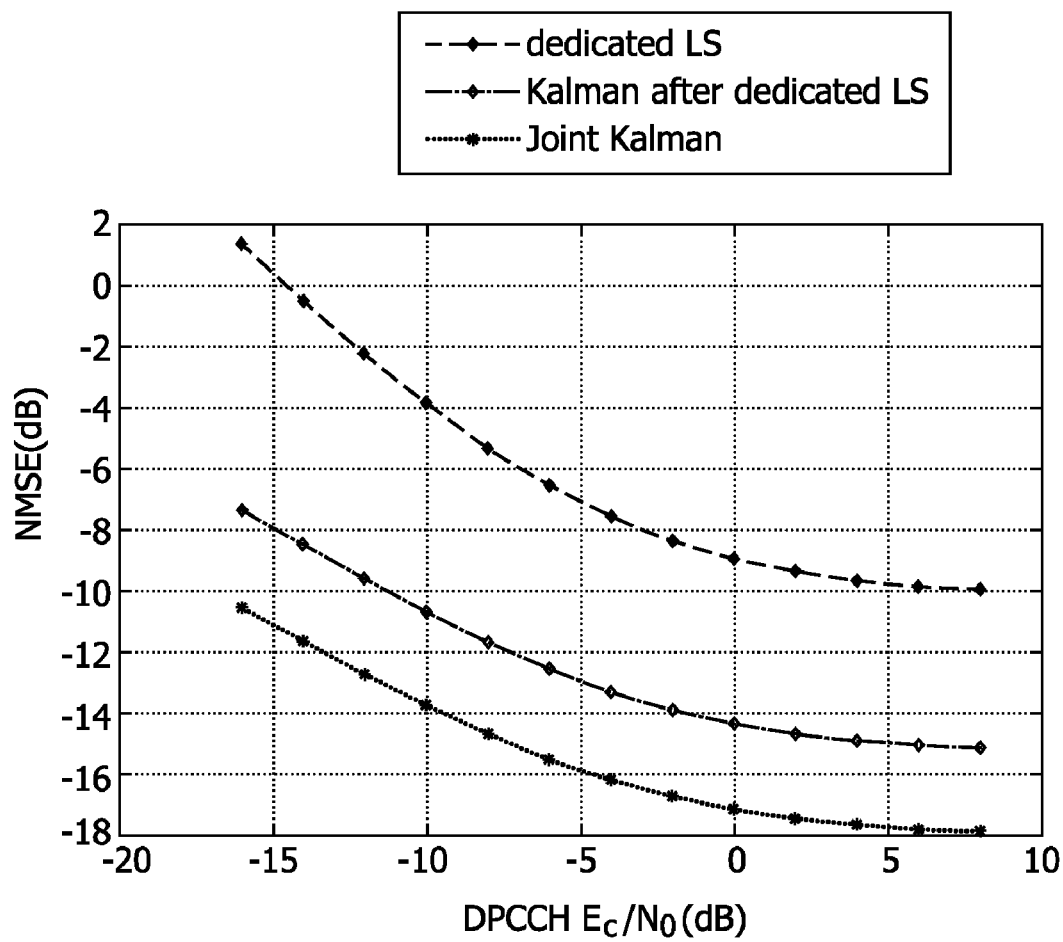

Finally, the diagram of FIG. 8 relates to a case where only the cross correlation is very strong, i.e., $\rho=0.8$ and $\alpha=0.99$. Here, the joint vector Kalman filtering provides a significant improvement of −3 dB in NMSE performance compared to scalar Kalman filtering.

In summary, a receiver apparatus and method of channel estimation have been described for a telecommunication system which provides at least two pilot sequences. Channel estimation is achieved by estimating channel taps separately for each of said at least two pilot sequences in every transmission block, and for applying estimated channel taps obtained from the estimation to at least one of a temporal and spatial filtering or combining operation to refine a channel estimate. Accordingly, temporal correlations and cross-correlations of the at least two pilot sequences are exploited without requiring knowledge of path delays and beamforming parameters.

It is noted that the present invention is not restricted to the above preferred embodiment and can be applied in any telecommunication system which provides at least two pilot sequences which can be exploited separately. The initial separate tap estimation for each of the pilot sequences may be based on any suitable estimation technique and is not limited to the described LS estimation. Similarly, the filtering operation may be any recursive estimator technique suitable to exploit correlations between estimated taps of different pilot sequences. Vector Kalman filtering is a preferred approach for both exploiting the temporal correlation of successive realizations of either the dedicated or the common pilot channel while, at the same time and in a jointly optimized fashion, exploiting the cross-correlation between the two channels. However the presented approach applies to any "reasonable/feasible" filtering or combining operation exploiting those two properties, which are inherent to the propagation channels physical characteristics. The case where only common pilot channel is present represents a particular instance of the presented framework. The user dedicated channel can still be estimated by the proposed method under such circumstances, even though poorer performances can be expected. The case where only the dedicated pilot channel is present represents another particular instance of the presented framework. The user dedicated channel can still be estimated by the proposed method under such circumstances, even though poorer performances can be expected. The method applies to any combination of beamforming or non-beamforming in the dedicated pilot channel and the common pilot channel. The preferred embodiment may thus vary within the scope of the attached claims.

Finally but yet importantly, it is noted that the term "comprises" or "comprising" when used in the specification including the claims is intended to specify the presence of stated features, means, steps or components, but does not exclude the presence or addition of one or more other features, means, steps, components or group thereof. Further, the word "a" or "an" preceding an element in a claim does not exclude the presence of a plurality of such elements. Moreover, any reference sign does not limit the scope of the claims.

The invention claimed is:

1. A receiver apparatus for use in a telecommunications system which provides at least two pilot sequences, said receiver apparatus comprising channel estimation means for estimating channel taps separately for each of said at least two pilot sequences in every transmission block, and for applying information of estimated channel taps obtained from said estimation to at least one of a temporal and spatial filtering or combining operation to refine a channel estimate, wherein said channel estimation means is adapted to estimate at least one correlation factor for said obtained estimated channel taps, to compare said at least one correlation factor with a respective threshold value, and to select between a scalar filtering operation, involving estimated taps of only one of said at least two pilot sequences, and a vector filtering operation, involving estimated taps of more than one of said at least two pilot sequences, based on the result of said comparison.

2. An apparatus according to claim 1, wherein said at least two pilot sequences comprise a first pilot sequence broadcast in a common pilot channel, and a second pilot sequence broadcast in a dedicated pilot channel.

3. An apparatus according to claim 1, wherein said estimation is a least square estimation.

4. An apparatus according to claim 1, wherein said filtering operation is a Kalman filtering operation.

5. An apparatus according to claim 1, wherein said channel estimation means is adapted to estimate a temporal correlation factor and a cross correlation factor, and to compare said temporal and cross correlation factors with respective threshold values.

6. An apparatus according to claim 1, wherein said at least one correlation factor is estimated by a covariance matching technique.

7. A method of channel estimation, comprising:
estimating a dedicated physical channel (DPCH) and a common pilot channel (CPICH) in every transmission block;
calculating a tap error variance for the DPCH and the CPICH for estimating a temporal correlation factor and a cross-correlation factor;
performing threshold comparisons between the temporal correlation factor and a temporal correlation threshold and the cross-correlation factor and a cross-correlation threshold;
if the temporal correlation factor is greater than the temporal correlation threshold and the cross-correlation factor is less than the cross-correlation threshold, performing a recursive minimum mean square error (MMSE) estimation over the DPCH estimate; and
if not, performing recursive minimum mean square error (MMSE) estimation over the DPCH estimate and the CPICH estimate.

8. The method of claim 7, wherein estimating the DPCH and the CPICH is a least-square estimate.

9. The method of claim 7, wherein the temporal correlation factor and the cross-correlation factor is estimated by applying covariance matching techniques.

10. The method of claim 7, wherein the recursive MMSE estimation over the DPCH estimate is a scalar Kalman filtering.

11. The method of claim 7, wherein the recursive MMSE estimation over the DPCH estimate and the CPICH estimate is a vector Kalman filtering.

12. A method of operating a receiver apparatus for use in a telecommunications system, comprising providing at least two pilot sequences; estimating channel taps separately for each of said at least two pilot sequences in every transmission block; and applying information of estimated channel taps obtained from said estimation to at least one of a temporal and spatial filtering or combining operation to refine a channel estimate, wherein said estimating comprises estimating at least one correlation factor for said obtained estimated channel taps; comparing said at least one correlation factor with a respective threshold value; and selecting between a scalar filtering operation, involving estimated taps of only one of said at least two pilot sequences, and a vector filtering operation, involving estimated taps of more than one of said at least two pilot sequences, based on the result of said comparing.

13. The method of claim 12, wherein said at least two pilot sequences comprise a first pilot sequence broadcast in a common pilot channel, and a second pilot sequence broadcast in a dedicated pilot channel.

14. The method of claim 12, wherein said estimation is a least square estimation.

15. The method of claim 12, wherein said filtering operation is a Kalman filtering operation.

16. The method of claim 12, wherein said estimating comprises estimating a temporal correlation factor and a cross correlation factor; and comparing said temporal and cross correlation factors with respective threshold values.

17. The method of claim 12, wherein said at least one correlation factor is estimated by a covariance matching technique.

* * * * *